(12) United States Patent
Higley

(10) Patent No.: US 11,119,281 B2
(45) Date of Patent: Sep. 14, 2021

(54) COMPLIANT ADAPTER

(71) Applicant: US Conec, Ltd, Hickory, NC (US)

(72) Inventor: Jason Higley, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 16/795,490

(22) Filed: Feb. 19, 2020

(65) Prior Publication Data

US 2020/0264384 A1 Aug. 20, 2020

Related U.S. Application Data

(60) Provisional application No. 62/807,820, filed on Feb. 20, 2019.

(51) Int. Cl.
*G02B 6/00* (2006.01)
*G02B 6/38* (2006.01)

(52) U.S. Cl.
CPC ......... *G02B 6/3825* (2013.01); *G02B 6/3831* (2013.01); *G02B 6/3874* (2013.01); *G02B 6/3897* (2013.01)

(58) Field of Classification Search
CPC .. G02B 6/3825; G02B 6/3874; G02B 6/3831; G02B 6/3897; G02B 6/3879; G02B 6/00
See application file for complete search history.

(56) References Cited

U.S. PATENT DOCUMENTS

| 2005/0135752 A1* | 6/2005 | Kiani | G02B 6/3895 |
| | | | 385/55 |
| 2016/0252685 A1* | 9/2016 | Carapella | G02B 6/3897 |
| | | | 385/87 |
| 2019/0018201 A1* | 1/2019 | Takano | G02B 6/387 |

FOREIGN PATENT DOCUMENTS

| WO | 2019126333 A1 | 6/2019 |
| WO | 2020160254 A1 | 8/2020 |

OTHER PUBLICATIONS

FOCIS 10 Fiber Optic Connector Intermateability Standard—Type LC, Mar. 6, 2002.

* cited by examiner

*Primary Examiner* — Jennifer Doan
(74) *Attorney, Agent, or Firm* — Michael L. Leetzow, P.A.; Shubhrangshu Sengupta

(57) ABSTRACT

A compliant adapter for fiber-optic connectors that are inserted into a cut-out in a panel include a main body extending between a first end and a second end and a compliant piece disposed at the second end of the main body that is movable between a relaxed position and a compressed position. The compliant adapter has a first opening area in the relaxed position and a smaller second opening area in the compressed position.

15 Claims, 10 Drawing Sheets

COMPLIANT ADAPTER

REFERENCE TO RELATED CASE

This application claims priority under 35 U.S.C. § 119 (e) to provisional application No. 62/807,820 filed on Feb. 20, 2019, the contents of which are hereby incorporated by reference in their entirety.

BACKGROUND OF THE INVENTION

Conventionally, LC duplex fiber optic connector formats are used in various back panel applications. The TIA/EIA-604-10A standard defines LC Duplex Adapter footprint requirements and panel/cutout dimensions requirements. See, for example, page 15 of the standard, with m=3 and m=4, "m" being a form factor. These dimensions of the cutout (or the openings in which the adapters are inserted) are common for LC/SC type connector.

Fiber optic connector formats that are used in high density applications have a larger footprint and are incompatible with the aforementioned standard for adapters that are used with LC duplex fiber optic connectors. The established standard footprint for LC/SC duplex adapters is not efficient in terms of density—both in height and width. Certain adapter formats, such as the Mini-Duplex Connector (MDC) adapter, can achieve that dimension of the cutout in width, but cannot in height. Such MDC connectors and adapters are described, for example, in Applicant's International Published Patent Application No. WO/2019/126333, entitled "Mini Duplex Connector with Push-Pull Polarity Mechanism and Carrier." The contents of this patent application are also incorporated herein by reference in their entirety. One option is to reduce the thickness of the adapter wall to fit this standard cutout dimension. However, this compromises the strength of the adapter and hence may cause problems with the connection.

There is a need for new connector adapter formats to be backwards compatible to the LC duplex envelope/footprint, without compromising on other performance parameters. Such an adapter is provided with the following invention.

SUMMARY OF THE INVENTION

The present invention is directed to a compliant adapter for use with fiber-optic connectors and to be inserted into a panel that includes a main body extending between a first end and a second end, a compliant piece disposed at the second end of the main body and movable between a relaxed position and a compressed position, wherein the second end has a first opening area in the relaxed position and a smaller second opening area in the compressed position.

In some embodiments, the main body and compliant piece form a one single-piece component.

In some embodiments, the compliant piece is a separate piece from the main body and is attached thereto.

In some embodiments, there is a central portion in the main body, the central portion including a plurality of connector alignment structures.

In yet another aspect, the present invention is directed to a two-piece compliant adapter for use with fiber optic connectors to be inserted into a panel that includes a main body extending between a first end and a second end, the first end having a larger outer circumference than the second end and having a standard central opening to receive fiber-optic connectors, and a compliant piece mateable to the main body at the second end and movable between a relaxed position and a compressed position, wherein the second end has a first opening area in the relaxed position and a smaller second opening area in the compressed position.

In some embodiments, there are also mating latches on the compliant piece to engage a portion of the main body.

In some embodiments, the compliant piece includes a lead-in surface and when force is exerted on the lead-in surface from the panel the complaint piece moves from the relaxed position to the compressed position.

In other embodiments, the compliant piece has grooves within the standard central opening to receive corresponding legs on the compliant piece to align the compliant piece within the standard central opening.

In yet another aspect, the present invention is directed to method for inserting into a panel, an adapter that has a larger outer diameter than a cut-out in the panel that includes aligning a compliant piece of the adapter with the cutout in the panel, the cut-out having a height less than a height of the adapter having the compliant piece, compressing the compliant piece during passage through the cut-out in the panel to allow the adapter to pass within the cut-out, and pushing the adapter through the cutout as the compliant piece decompresses and returns to a relaxed state upon a full insertion into the adapter.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
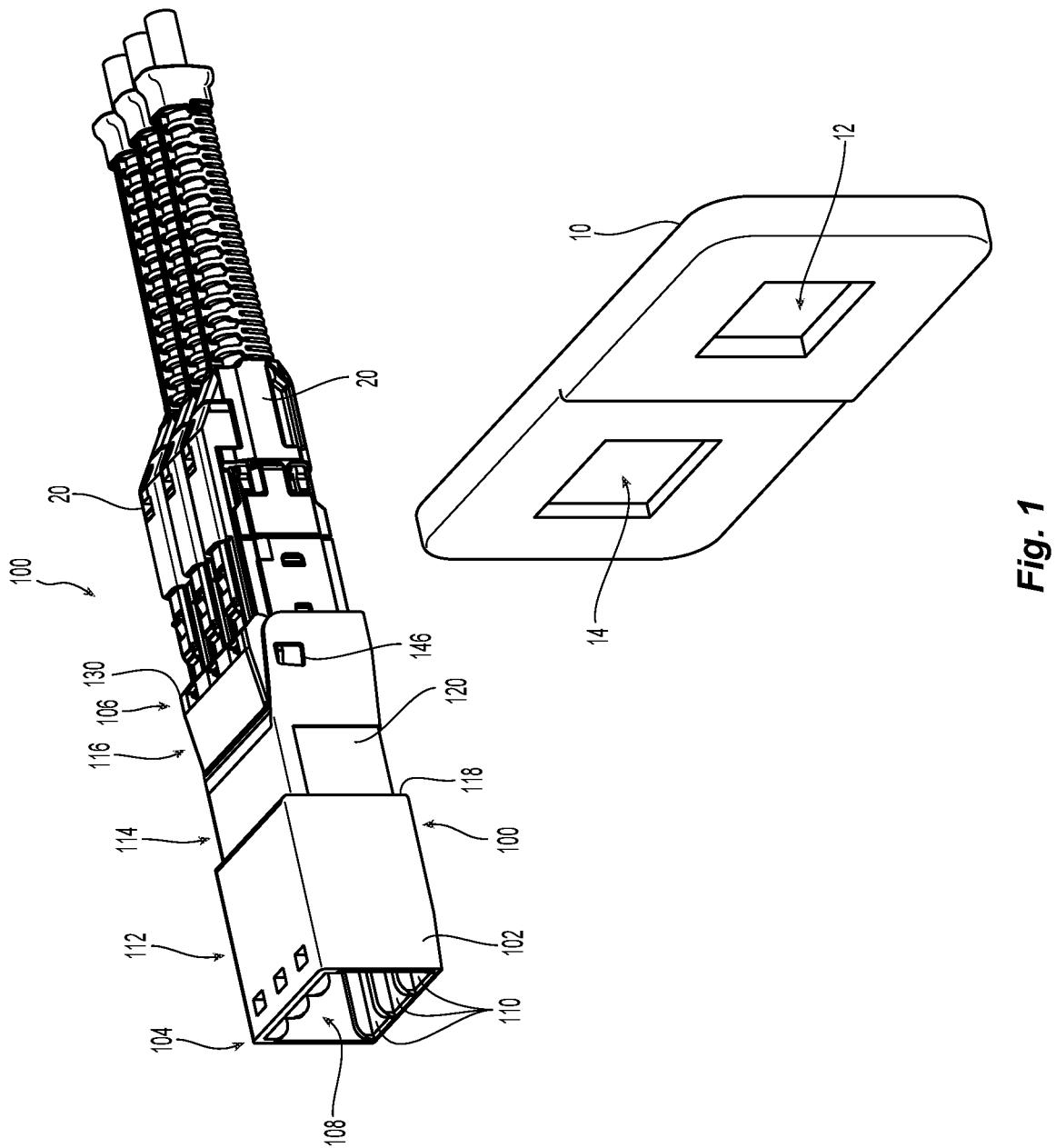
FIG. 1 is a front left side perspective view of one embodiment of a compliant adapter with duplex fiber optic connectors according to the present invention and a portion of a panel having two different sized openings.

Reference will now be made in detail to the present preferred embodiment(s) of the invention, examples of which are illustrated in the accompanying drawings. Whenever possible, the same reference numerals will be used throughout the drawings to refer to the same or like parts.

FIG. 1 illustrates portion of a panel 10 having two different sized openings, a smaller opening 12 and a larger opening 14. These openings 12, 14 correspond to two of the sizes defined in TIA/EIA-604-10A. FIG. 1 also illustrates a front left side perspective view of one embodiment of a compliant adapter 100 with duplex fiber optic connectors 20 inserted into the compliant adapter 100 according to the present invention. The fiber optic connectors 20 may inserted into either end of the compliant adapter 100 and may be the same as or similar to those disclosed in Applicant's PCT publication discussed above.

The compliant adapter 100 has a main body 102 that extends between a first end 104 and a second end 106. At the first end 104, the compliant adapter 100 has a standard opening 108 that can receive the fiber optic connectors 20. As illustrated in FIG. 1, there are three positions for fiber optic connectors 20 in the first end 104 formed by grooves 110 in the top and bottom of the first end 104.

It should be noted that the main body 102 of the compliant adapter 100 is made from a generally hard plastic (such as polycarbonate, polyetherimide or nylon), and is not generally intended to be flexible. While the main body may flex if sufficient pressure is applied, it is intended to be more rigid than flexible. If too much pressure/force is applied, the main body may crack or break. The characteristics are inherent in the materials that are used for each of the components in the compliant adapter 100.

The main body 102 may have different segments or portions. At the first end 104, the main body 102 has a first segment 112 that includes the standard opening 108 that can receive the fiber optic connectors 20. The first segment 112 generally has a larger outer diameter than the rest of the main body 102. However, variations of the compliant adapter 100 including the same outer dimensions for the first segment 112 and the second segment 114 are within the scope of this disclosure. The second segment 114 is immediately adjacent the first segment 112 and positioned between the first segment 112 and a third segment 116. There is a step or shoulder 118 at the junction of the first segment 100 and the second segment 114. The shoulder 118 provides a stop and prevents the compliant adapter 100 from being inserted too far into the panel 10 or being pulled through the panel 10. See, e.g., FIG. 7.

The second segment 114 has a height H and a width W that matches the size of the smallest opening 12 in the panel 10. See, e.g., FIG. 6. It generally is the position of the compliant adapter 100 that is disposed within the openings 12, 14 of the panel 10 during use. The second segment 114 may also have a depression 120 that can receive a metal latch to assist in retaining the compliant adapter 100 in the panel 10.

The third segment 116 also includes the second end 106 and is the compliant end of the compliant adapter 100 that passes through the openings 12, 14 of the panel 10. It is this end of the compliant adapter 100 that is the main focus of this application. As see in FIG. 2, the third segment 116 has a three sided-opening 122 into the second end 106.

In one embodiment of the compliant adapter 100, the compliant adapter 100 is a two piece adapter. See FIG. 2. However, one of skill in the art would be able to, with the teachings herein, be able to achieve the same functions from a one single-piece component. Yet alternatively, the compliant adapter 100 may well have three or more pieces, e.g., one piece for the first segment 112 and another piece combining the second segment 114 and the third segment 116.

Figure 3:
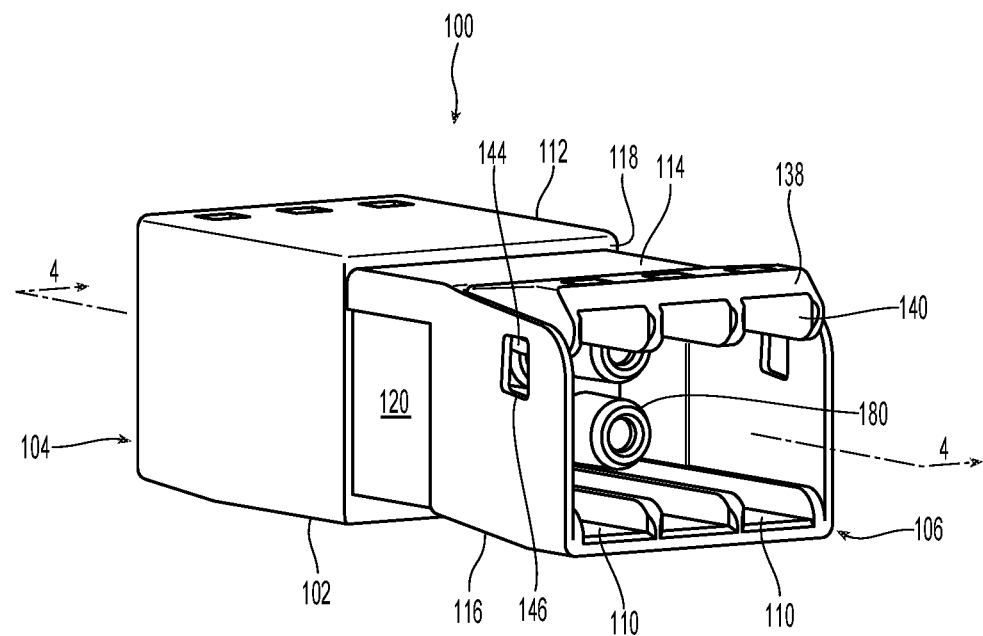
FIG. 3 is a left side perspective view of the compliant end of the compliant adapter in FIG. 1.
Figure 4:
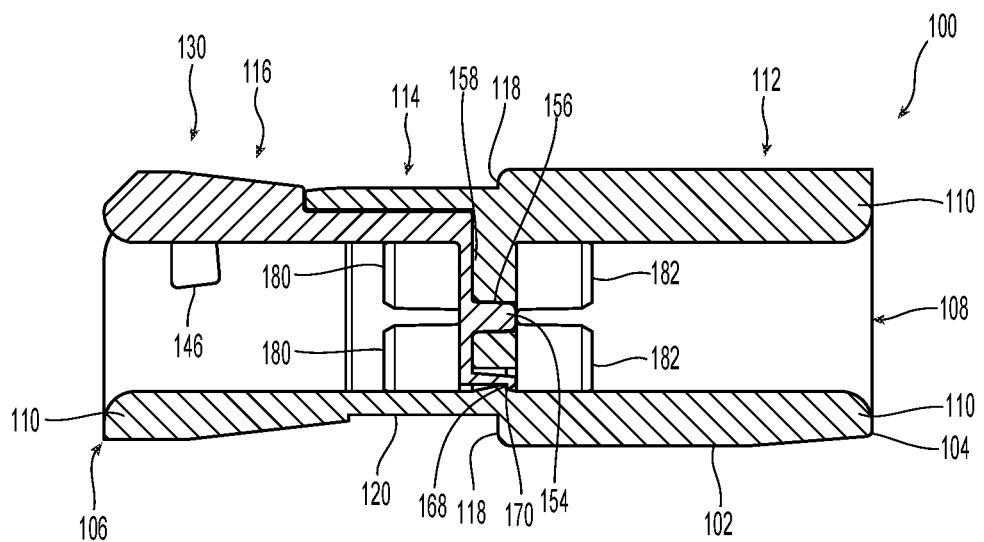
FIG. 4 is a cross section view of the compliant adapter along the lines 4-4 in FIG. 3.

The compliant adapter 100 includes a compliant piece 130 disposed at the second end 106 of the main body 102. See FIGS. 2-4. The compliant piece 130 is inserted into the three-sided opening 122 to provide for the changing of the dimensions of the compliant adapter 100 that allows the second end 106 to be inserted into the panel 10.

The compliant piece 130 has a first portion 132 that is connected to a second portion 134 by a plurality of legs 136. The first portion 132 has a lead-in surface 138 that engages the panel 10 as explained in detail below. The first portion 132 also has a number of grooves 140 that will guide the fiber optic connectors 20 that are to be inserted into the compliant adapter 100. There are also a number of fiber optic connector latch holes 142 to engage with latches on the fiber optic connectors 20 to retain the fiber optic connectors 20 in the compliant adapter 100. One either side of the first portion 132 are preferably detents 144. While two detents 144 are illustrated, there may only be one. The detents 144 are configured to be disposed within side openings 146 in the third segment 116 adjacent the second end 106. There is one side opening 146 on each side of the main body 102, and the side openings 146 allow movement of the detents 144 within the opening, thereby allowing the first portion 132 to move between a relaxed position and a compressed position, as discussed in more detail below.

Turning to FIGS. 2, 4, and 8-12, the compliant piece 130 is illustrated in more detail. The second portion 134 of the compliant piece 130 has a number of structures that allow for the alignment of the compliant piece 130 within the main body 102. The second portion 134 also includes a number of latches to secure the compliant piece 130 within the main body 102.

Figure 13:
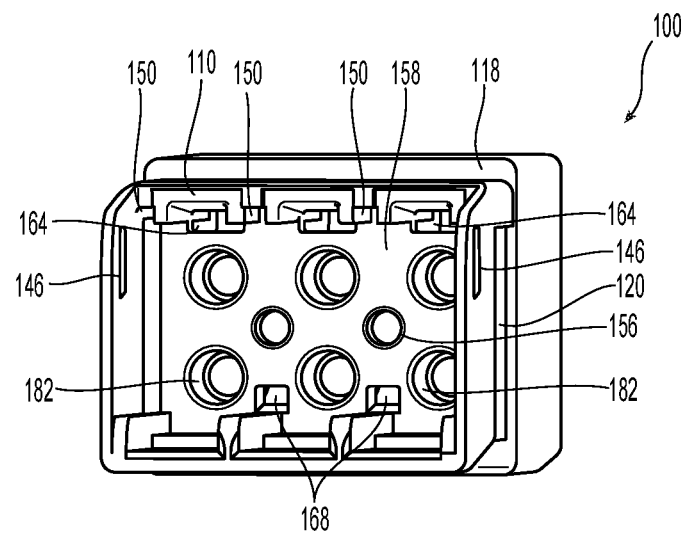
FIG. 13 is a right side perspective view from the compliant end of the main body of the compliant adapter.
Figure 14:
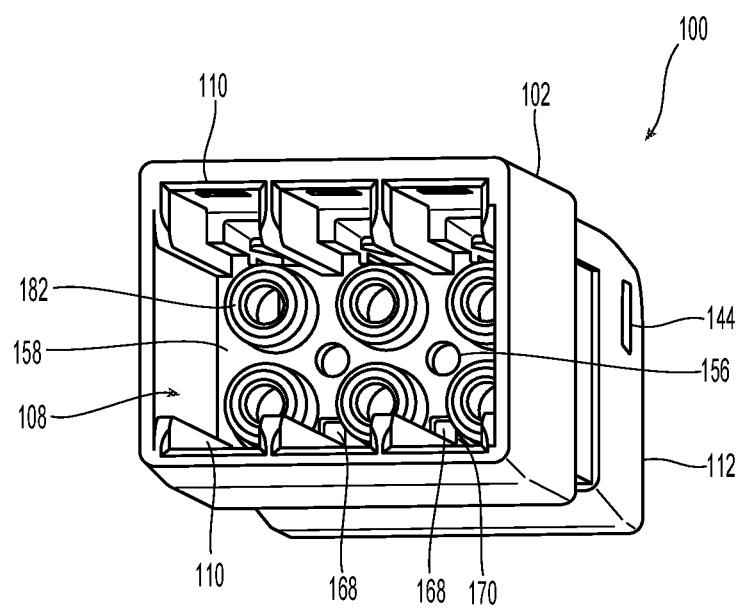
FIG. 14 is a left perspective view from the end of the main body of the compliant adapter.

First, the main body 102 has a number of leg grooves 150 on a top surface within the three-sided opening 122 at the second end 106. Each of the leg grooves 150 receives one of the plurality of legs 136. The combination of the legs 136 on the compliant piece 130 with the leg grooves 150 ensure that the compliant piece 130 is aligned within the opening at the second end 106. Further, there are two alignment posts 154 extending from the second portion 134 in a direction away from the first portion 132. The two alignment posts 154 will be disposed within an alignment hole 156 in a central partition 158 within the main body 102. See FIGS. 4 and 13-14. This combination of the alignment posts 154 with the alignment hole 156 and the legs 136 in the leg grooves 150 ensures the proper location of the compliant piece 130 within the main body 102.

Figure 2:
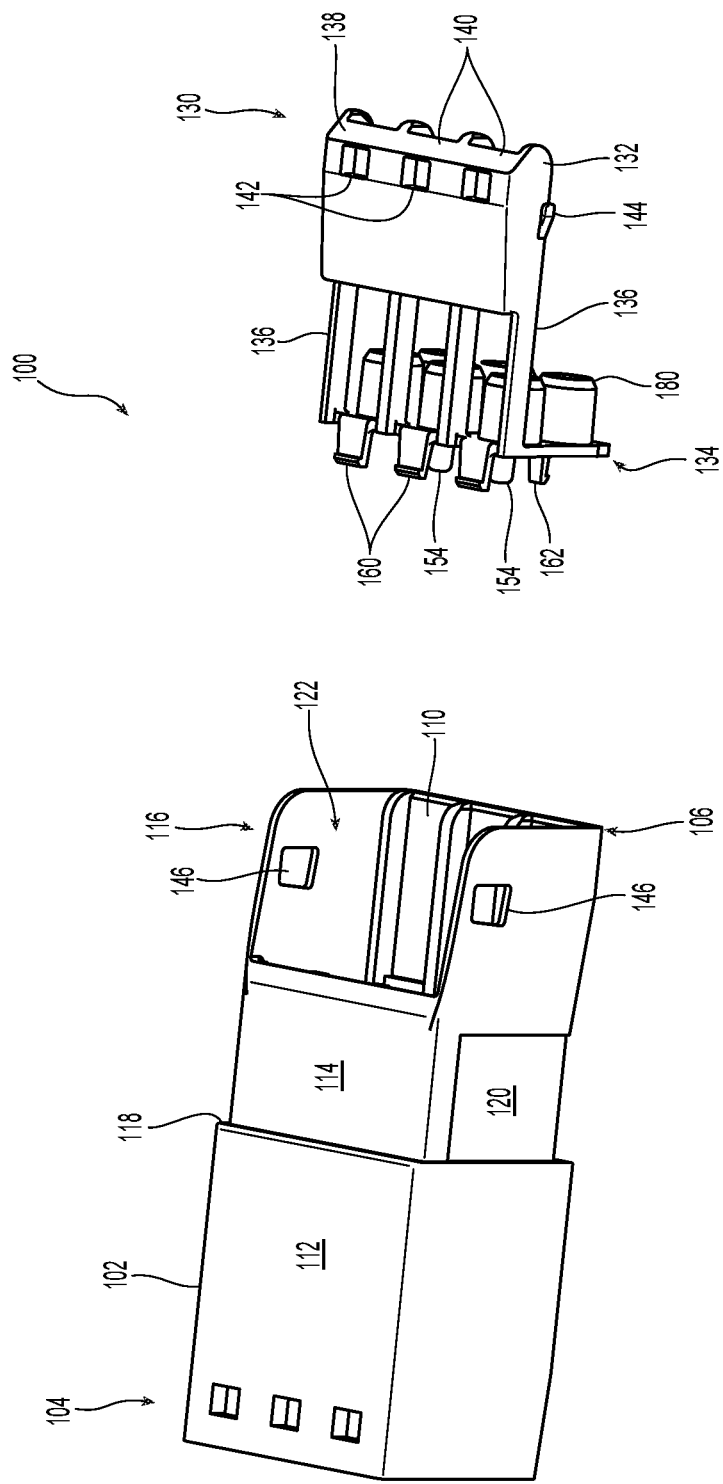
FIG. 2 is a left side perspective view of the compliant adapter in FIG. 1 with a second compliant piece removed.
Figure 10:
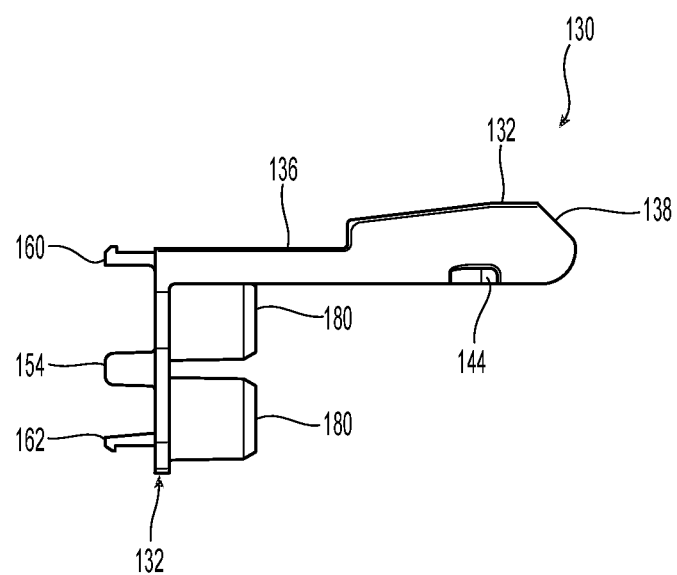
FIG. 10 is a left side elevational view of the compliant piece of the compliant adapter in the relaxed position.
Figure 11:
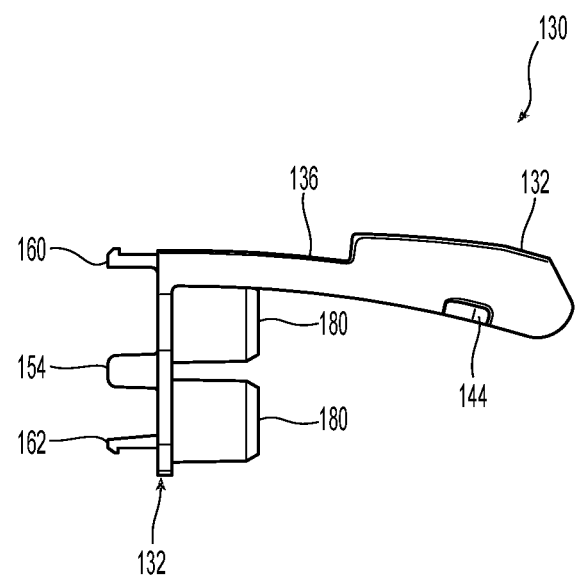
FIG. 11 is a left side elevational view of the compliant piece of the compliant adapter in the compressed position.
Figure 12:
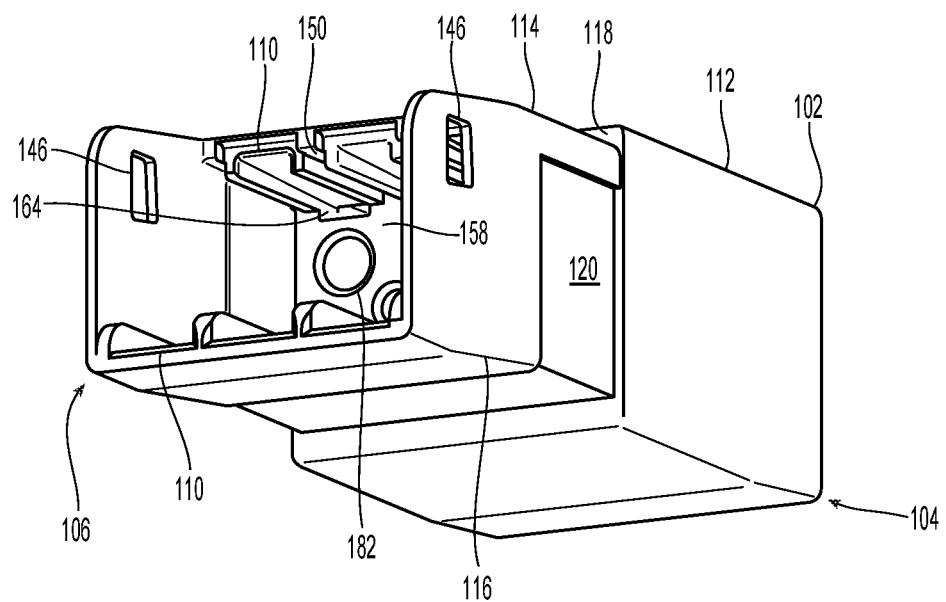
FIG. 12 is a bottom perspective view from the compliant end of the main body of the compliant adapter.

Second, the second portion 134 also includes a plurality of latches 160 to engage a portion of the main body 102. As best seen in FIGS. 2, 10, and 11, there are a number of latches 160 on the top and a number of latches 162 on the bottom of the second portion 134. While there are three latches 160 on the top and two latches 162 on the bottom, there could be a different number, including none on one of the top and/or the bottom. The latches 160 on the top of the second portion 134 will align with the grooves 110 as the compliant piece 130 is pushed inward. Each of the latches 160 proceed through a latch cut-out 164 in the central partition 158. See FIG. 12. On the other side of the latch cut-out 164 is a latch surface 166 that the latches 160 engage to retain the compliant piece 130 in the main body 102. Similarly, the bottom latches 162 also pass through a latch cutout 168 on the bottom of the main body 102 and engage a surface 170. See FIG. 4.

The second portion 134 also has a plurality of connector alignment structures 180 that function to align the fiber optic connectors 20 inserted into the compliant adapter 100. As will be recognized, there are six connector alignment structures 180 present on the second portion 134, which correspond to the three duplex connectors as discussed above. The connector alignment structures 180 are used to align the fiber optic connector within the compliant adapter 100 and the fiber optic connectors that are inserted from the other side. As illustrated, the connector alignment structures would engage the fiber optic ferrules that are contained within the fiber optic connector 20. Thus, the connector alignment structures 180 align the mating fiber optic ferrules. However, other structures may be used to align the fiber optic connectors 20 (and the optical fibers within those fiber optic connectors). When the compliant piece 130 is installed within the main body 102 of the compliant adapter 100, the connector alignment structures 180 are aligned with corresponding connector alignment structures 182 that are present in the standard opening 108, thereby aligning the fiber optic connectors inserted into the compliant adapter 100 from both ends. See, e.g., FIG. 4.

Figure 5:
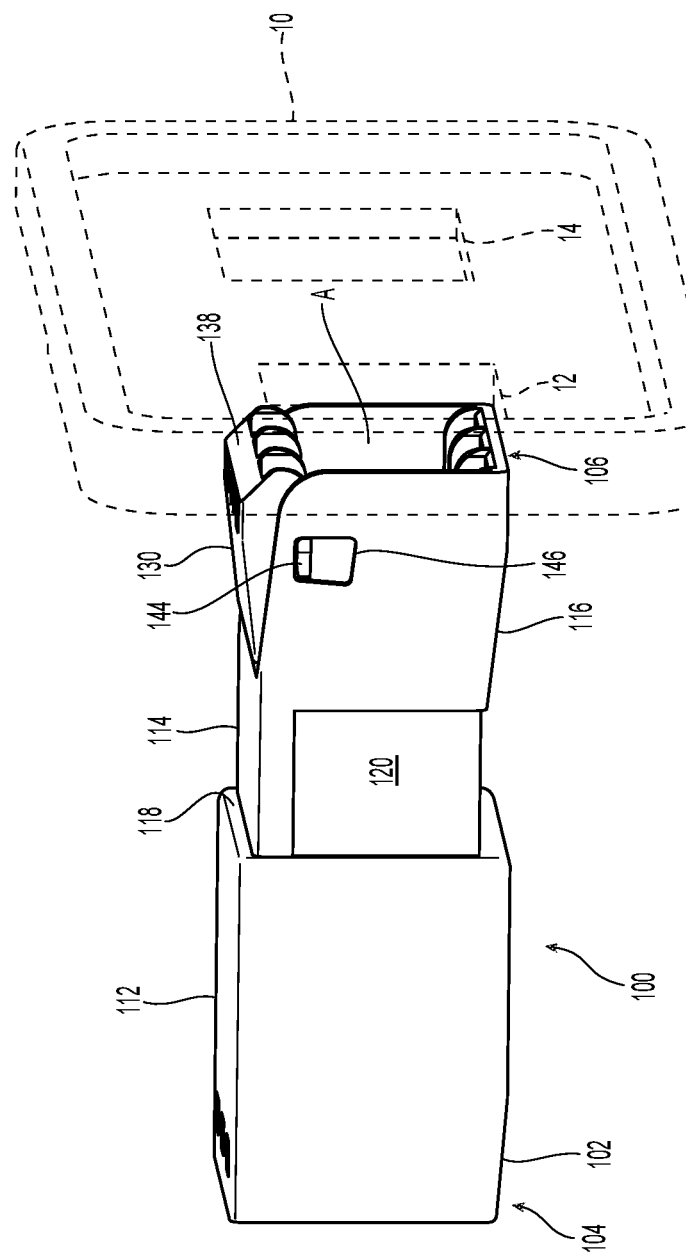
FIG. 5 is left side perspective view of the compliant adapter in FIG. 1 just before being inserted into the smaller of the two openings in the panel.
Figure 6:
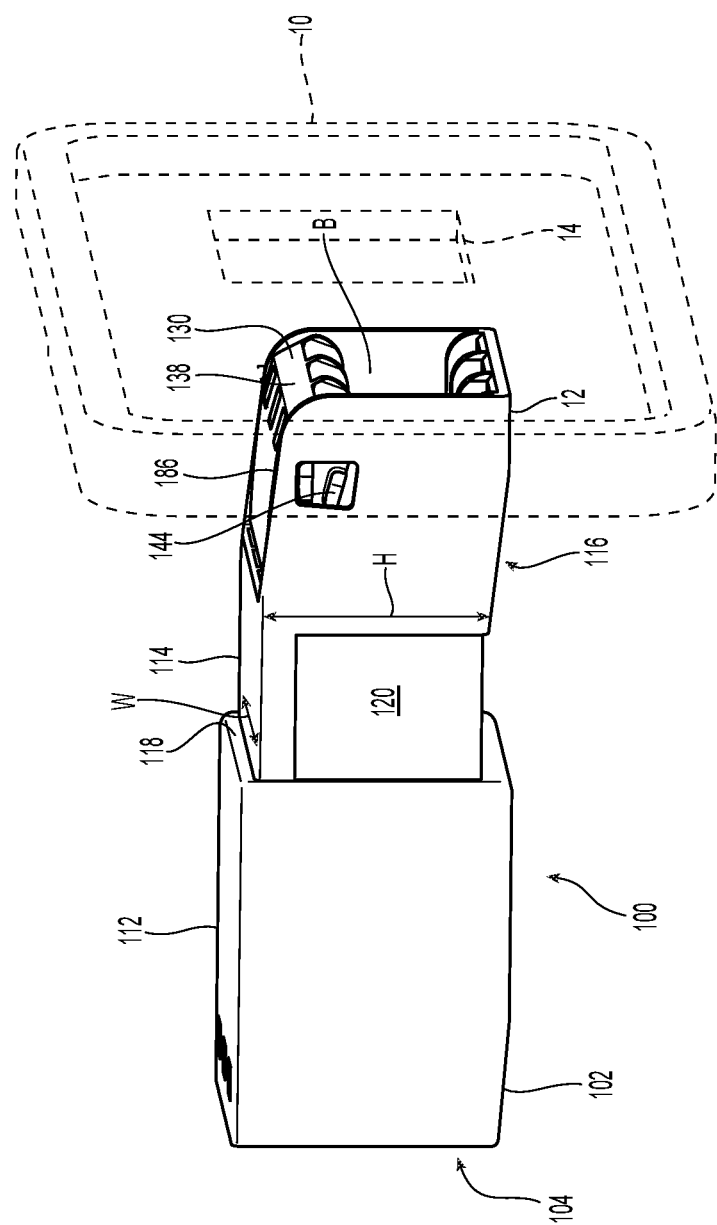
FIG. 6 is a left side perspective view of the compliant adapter in FIG. 1 with the compliant end of the compliant adapter first inserted into the smaller of the two openings in the panel and the compliant piece being in the compressed position.
Figure 7:
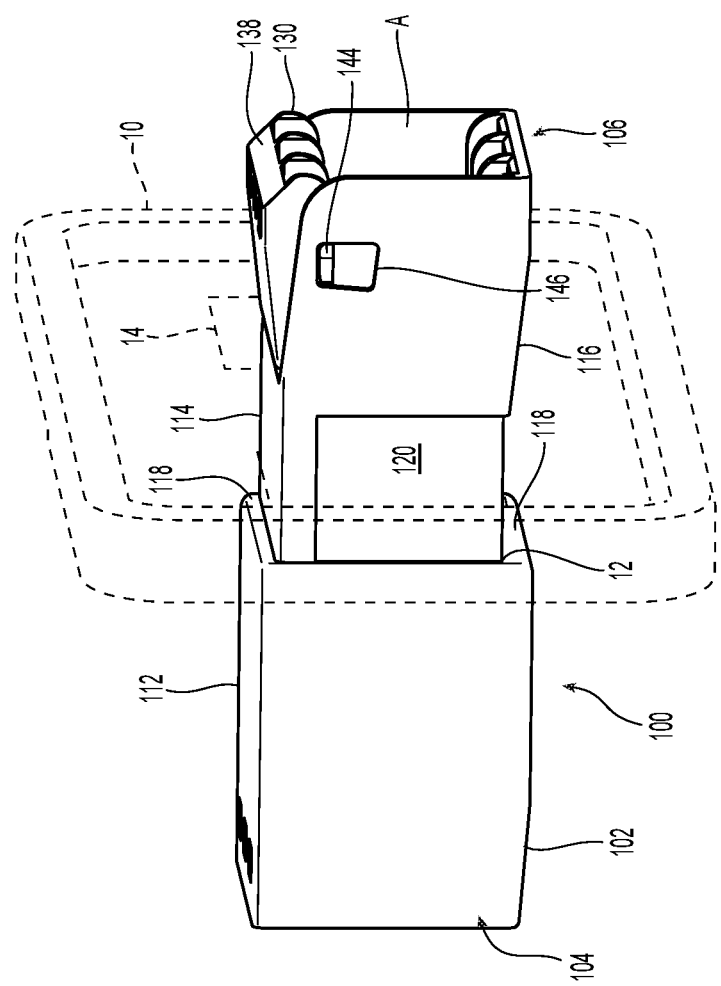
FIG. 7 is a left side perspective view of the compliant adapter in FIG. 1 fully inserted into the smaller of the two openings in the panel with the compliant piece back to the relaxed position.
Figure 8:
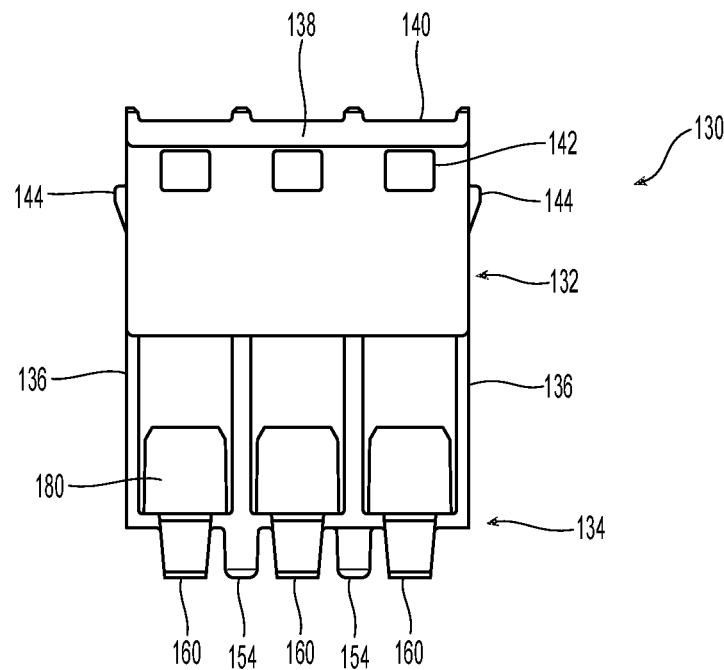
FIG. 8 is a top view of the compliant piece removed from compliant adapter.
Figure 9:
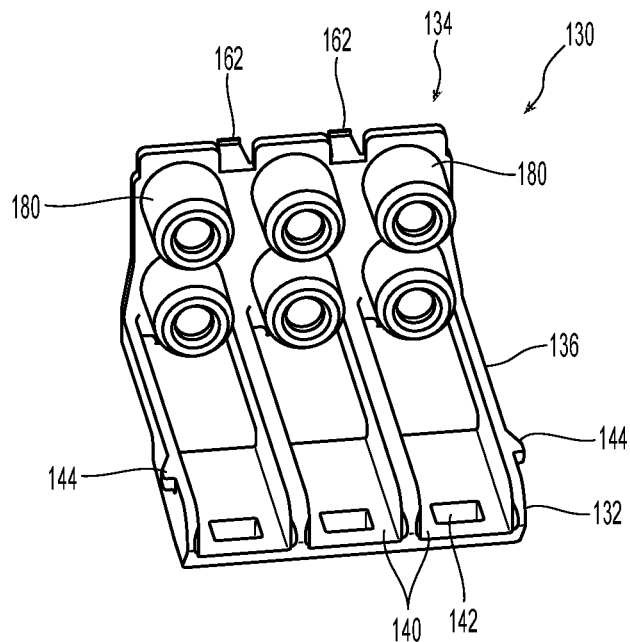
FIG. 9 is a bottom view of the compliant piece removed from compliant adapter.

The use of the compliant adapter 100 will now be explained with reference to FIGS. 5-7. In FIG. 5, the compliant adapter 100 approaches the smaller opening 12 in the panel 10. In this configuration, the compliant piece 130 is in a relaxed position. See also FIG. 10. However, the area identified as A in FIG. 5 at the second end 106 of the compliant adapter 100 is too large to fit within the opening 12, this area A being determined by the dimensions of the smaller opening 12 and of the MDC connectors that will eventually reside within the compliant adapter 100. As the compliant adapter 100 continues forward and makes contact with the panel 10 as it passes through the opening (see FIG. 6), the compliant piece 130 is deflected downward into the opening of the compliant adapter 100 at the second end 106 because the lead-in surface 138 makes contact with the panel 10. If there is no lead-in surface 138 on the compliant piece 130, then the user could push on the compliant piece 130 to deflect it downward instead. It should be noted that in FIG. 6, the compliant piece 130 is below a top surface 186 of the main body 102 at the second end 106. At this point, the compliant piece 130 is in its compressed position. See FIG. 11. The detents 144, disposed within side openings 146 rotate with the movement (compression) of the compliant piece 130. Additionally, the area at the second end 106 of the compliant adapter 100 has been reduced by this compression, as illustrated as the area at B in FIG. 6. In FIG. 7, the compliant adapter 100 has been pushed far enough into the panel 10 so that the compliant piece 130 has cleared the opening 12. The compliant piece 130 has returned to its relaxed position and now has a larger area A to receive the fiber optic connectors therein.

It will be appreciated that while the compliant piece 130 is described as a separate piece, in an alternative aspect, the compliant piece 130 may be an integral part of the overall compliant adapter 100. In this aspect, the compliant piece 130 may be made as an over-molded part out of a flexible material, such as a mixture of glass and nylon, whereas the rest of the compliant adapter 100 may be made of a relatively rigid part, such as polyetherimide. When the compliant piece 130 is made out of a relatively flexible material over-molded onto the harder material, some of the latching or attachment features that attach the compliant piece 130 to the compliant adapter 100 (e.g., alignment posts 154) may not be provided. However, the compliant piece 130 would still be able to clear the opening 12 due to the inherent flexible nature of the material being used that will allow the compliant piece 130 to deform during the insertion but revert back to the original shape when the compliant adapter 100 has attached to the panel.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A compliant adapter for use with fiber-optic connectors and to be inserted into a panel comprising:
   a main body extending between a first end and a second end; and
   a compliant piece disposed at the second end of the main body and movable between a relaxed position and a compressed position, wherein the second end has a first opening area in the relaxed position and a smaller second opening area in the compressed position, wherein the compliant piece includes a lead-in surface at the second end, wherein force exerted on the lead-in surface from the panel causes the compliant piece to flex from the relaxed position to the compressed position.

2. The compliant adapter according to claim 1, wherein the main body and compliant piece form a one single-piece component.

3. The compliant adapter according to claim 1, wherein the compliant piece is a separate piece from the main body and is attached thereto.

4. The compliant adapter according to claim 1, further comprising a central portion in the main body, the central portion including a plurality of connector alignment structures.

5. The compliant adapter according to claim 4, wherein the connector alignment structures are sleeve holes.

6. A two-piece compliant adapter for use with fiber optic connectors to be inserted into a panel comprising:
   a main body extending between a first end and a second end, the first end having a larger outer circumference than the second end and having a standard central opening to receive fiber-optic connectors; and
   a compliant piece mateable to the main body at the second end and movable between a relaxed position and a compressed position, wherein the second end has a first opening area in the relaxed position and a smaller second opening area in the compressed position.

7. The two-piece compliant adapter according to claim 6, further comprising mating latches on the compliant piece to engage a portion of the main body.

8. The two-piece compliant adapter according to claim 6, wherein the main body has at least one side opening and the compliant piece has at least one detent to be disposed within the at least one side opening.

9. The two-piece compliant adapter according to claim 6, wherein the compliant piece includes a lead-in surface and when force is exerted on the lead-in surface from the panel the compliant piece moves from the relaxed position to the compressed position.

10. The two-piece compliant adapter according to claim 6, wherein the main body has a central partition disposed between the first end and the second end and within the standard central opening.

11. The two-piece compliant adapter according to claim 10, wherein the central partition has a first plurality of connector alignment structures.

12. The two-piece compliant adapter according to claim 10, wherein the central partition includes post openings to receive alignment posts on the compliant piece.

13. The two-piece compliant adapter according to claim 11, wherein the compliant piece has a second plurality of connector alignment structures, the first plurality of connector alignment structures and the second plurality of connector alignment structures being aligned with one another.

14. The two-piece compliant adapter according to claim 6, wherein the compliant piece has fiber-optic connector latch holes to receive a portion of a fiber-optic connector inserted into the second end of the two-piece compliant adapter.

15. The two-piece compliant adapter according to claim 6, wherein the compliant piece has grooves within the standard central opening to receive corresponding legs on the compliant piece to align the compliant piece within the standard central opening.

* * * * *